A. S. EDDY.
Evaporating Pan.
No. 57,301.
Patented Aug. 21, 1866.
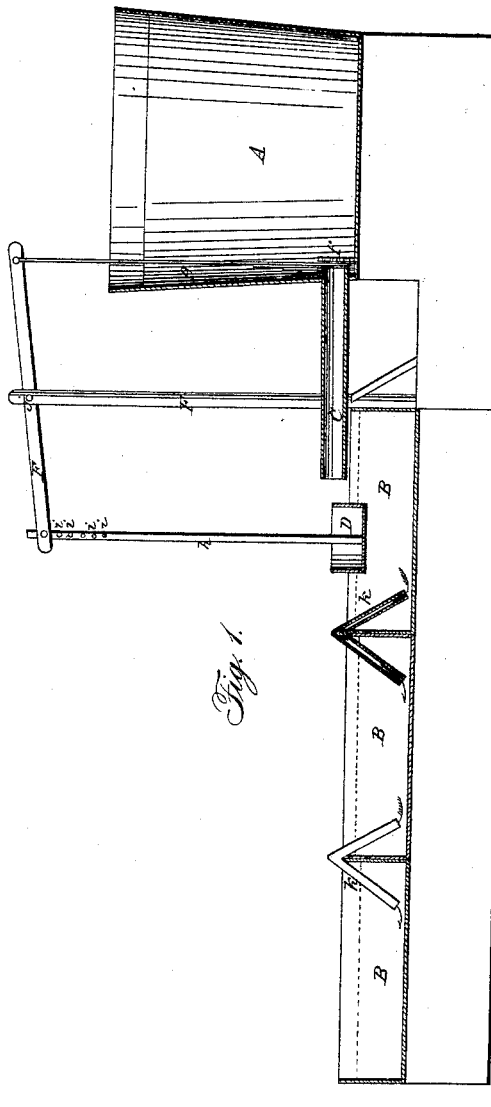
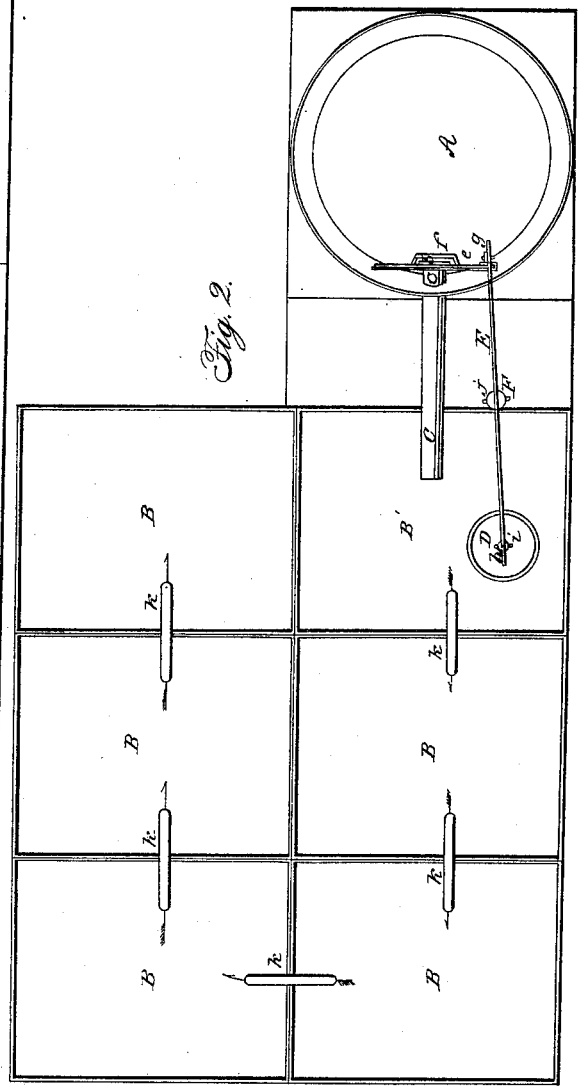
Witnesses:
Samuel Harris
R. D. O. Smith
Inventor:
Augustus S. Eddy
By his Attorney
J. B. Woodruff & Son

UNITED STATES PATENT OFFICE.

AUGUSTUS S. EDDY, OF SMITHVILLE, NEW YORK.

IMPROVED EVAPORATOR.

Specification forming part of Letters Patent No. 57,301, dated August 21, 1866.

*To all whom it may concern:*

Be it known that I, AUGUSTUS S. EDDY, of the town of Smithville, in the county of Chenango, in the State of New York, have invented certain new and useful improvements in apparatus for supplying and regulating the flow of maple-sap or other juice into evaporating pans or boilers for making sirup or sugar; and the following is a full, clear, and exact description of the same, reference being had to the accompanying drawings, making a part of this specification, in which—

Figure 1 represents a side elevation, or a section through the receiving-tank, supply-spout and cut-off, float, and evaporating-pans, connected by siphons. Fig. 2 shows a plan or top view of the same.

The object of my invention is to lessen the labor of making sirup or sugar from the sap of the sugar-maple or other juice which has to be evaporated or boiled down, and to keep a uniform supply in all of the pans, so that a large quantity of juice can be reduced uniformly and rapidly without the danger of burning a portion or requiring so close attention.

My invention consists in placing in the receiving tank or tub a self-acting gate or cut-off, to be operated by a float placed in one of the evaporating-pans, so connected to the gate by a lever as to open or close it by the height of the liquid in the pan.

My invention further consists in the application and use of siphons for conveying the sap or juice from one pan or boiler to another, or connecting the fluid in all of the series of evaporating-pans that may be required, keeping it at a uniform height in all as long as it is in a condition to flow.

To enable others skilled in the art to make and use my invention, I will describe it more fully, referring to the drawings, and to the letters marked thereon.

In the process of making maple sugar or sirup, for which my apparatus is more particularly designed, I have a large tub or tank, A, of sufficient capacity to hold the sap that will flow from the trees tapped, where it is all conveyed.

I make my fire-flues so as to place any desired number of evaporating-pans B B B near the tank A, they being shallow, and their tops low enough to admit the conducting-pipe C from the tank to discharge over the top.

Near the bottom of the tub or tank A is placed a spout, $c$, on the inner end of which is a sliding gate, $b$, attached to a lever, $e$, which closes the spout, there being a strainer of perforated metal or wire-gauze, $f$, to prevent any foreign substance from getting in to obstruct the action of slide $b$, or from getting in through the spout to the evaporating-pans B, so that the sap or juice is all strained as it is being admitted into the pans.

Into the first pan B', which receives the sap from the conducting-pipe C, I place a float, D, which is provided with a stem or rod, $h$, to connect with the balance-beam E, which is supported on a pin, $j$, in the top of the standard F. To the sliding gate $b$ or the small lever $e$ is attached a vertical stem or rod, $g$, which extends up above the top of the tank A, and is connected to the other end of the beam E, the rods $g$ and $h$ both having a series of pinholes, $i$ $i$ $i$ $i$, in their upper ends, so that the float D can be adjusted to any desired height to open and close the gate in the tub or tank, thus allowing a larger or smaller quantity of the liquid to be admitted into the evaporating-pans to undergo the process of evaporation, while it keeps up the exact supply, and the liquid at the same height, whether there be much or little in the pans at the time.

In the process of making maple sirup or sugar it is desirable to evaporate as fast as possible, and this can only be done by spreading the sap over a large surface. This I accomplish by having a number of pans of such size as to be most convenient for use, as also for the cleaning up after the season is over, which I place in rows, side by side, over the fire-places. I make the pans shallow, and keep the supply of sap the same height in all of the series by connecting them with siphons $k$ $k$ $k$.

The operation of making sirup or sugar with my improved apparatus is very simple and efficient, requiring but very little attention more than to keep the fire up under the pans or boilers. The sap or other saccharine juice being put into the tank, and a sufficient quantity in each pan to close the ends of the siphons, they will all be filled, according to the depth required, by placing the pin in the rod attached to the float, so that the gate entirely shuts off the flow. As the liquid evaporates and settles down in the pans, the float, following the surface, operates to open the gate, and keeps up the supply, so that as long as the liquid remains in a condition to flow through the siphons the whole apparatus is self-operating, and performs its functions more perfectly than can possibly be done by any tender.

It is a well-known fact that making maple sugar or sirup by the old process of boiling it down in kettles and supplying them by pouring in the sap from the bucket is a very laborious, expensive, and somewhat uncertain operation. The occasional supplying of the kettle with a large quantity of cold sap checks the evaporation for a considerable time, and has a tendency to give the sirup or sugar a dark color.

From practical experience the last season with my apparatus, as above described, it has been fully demonstrated that more than one-half of the labor is saved and a very superior quality of sirup and sugar made.

Having thus fully described my invention, what I claim as new, and desire to secure by Letters Patent, is—

1. The conducting-spout C, cut-off gate b, lever c, and strainer f, operated by the float D, connecting-rods g and h, balance-beam E, substantially as herein described.

2. In combination with the receiving tub or tank A, the evaporating-pans B B B', and siphons k k k, for the purpose herein set forth.

AUGUSTUS S. EDDY.

Witnesses:
LEWIS S. HAYES,
N. W. NORTHRUP.